United States Patent
Kolomeitsev et al.

(10) Patent No.: US 6,784,582 B1
(45) Date of Patent: Aug. 31, 2004

(54) MAGNET SHAPING AND POLE CONCENTRATION FOR REDUCTION OF COGGING TORQUE IN PERMANENT MAGNET MOTORS

(75) Inventors: Sergei F. Kolomeitsev, Rochester, MI (US); John R. Suriano, Auburn Hills, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/993,009

(22) Filed: Nov. 19, 2001

(51) Int. Cl.[7] .............................................. H02K 21/12
(52) U.S. Cl. ........................ 310/156.38; 310/156.01; 310/67 R
(58) Field of Search .................. 310/156.38, 156.45, 310/154.22, 154.28, 154.29, 156.01, 67 R, 154.25

(56) References Cited

U.S. PATENT DOCUMENTS

| | | | |
|---|---|---|---|
| 2,312,101 A | | 2/1943 | Killam et al. |
| 3,909,647 A | * | 9/1975 | Peterson ................ 310/156.12 |
| 4,217,508 A | | 8/1980 | Uzuka |
| 4,713,569 A | * | 12/1987 | Schwartz ..................... 310/152 |
| 4,748,359 A | | 5/1988 | Yahara et al. |
| 4,782,272 A | * | 11/1988 | Buckley et al. ............. 318/254 |
| 5,038,065 A | * | 8/1991 | Matsubayashi et al. ..... 310/162 |
| 5,095,238 A | * | 3/1992 | Suzuki et al. .......... 310/156.46 |
| 5,302,876 A | * | 4/1994 | Iwamatsu et al. ...... 310/156.12 |
| 5,345,130 A | * | 9/1994 | Kliman et al. ......... 310/156.13 |
| 5,369,325 A | * | 11/1994 | Nagate et al. ......... 310/156.54 |
| 5,485,045 A | | 1/1996 | Canders et al. |
| 5,682,072 A | * | 10/1997 | Takahashi .............. 310/156.46 |
| 5,708,310 A | | 1/1998 | Sakamoto et al. |
| 5,753,991 A | | 5/1998 | Couture et al. |
| 5,886,440 A | * | 3/1999 | Hasebe et al. ......... 310/156.19 |
| 6,081,058 A | * | 6/2000 | Suzuki et al. .......... 310/156.45 |
| 6,093,984 A | | 7/2000 | Shiga et al. |
| 6,140,736 A | | 10/2000 | Hsu |
| 6,181,035 B1 | * | 1/2001 | Acquaviva ................... 310/51 |
| 6,262,507 B1 | | 7/2001 | Sato et al. |
| 6,262,510 B1 | * | 7/2001 | Lungu ......................... 310/166 |
| 6,664,688 B2 | * | 12/2003 | Naito et al. ............. 310/156.01 |
| 2003/0067237 A1 | * | 4/2003 | Takahata et al. ....... 310/156.38 |

FOREIGN PATENT DOCUMENTS

JP            02211031    *   9/1990    ............ H02K/1/27

* cited by examiner

Primary Examiner—Burton S. Mullins
Assistant Examiner—Heba Elkassabgi
(74) Attorney, Agent, or Firm—J. Gordon Lewis

(57) ABSTRACT

A rotor for a permanent magnet motor with a rotor yoke and a permanent magnet ring mounted on the rotor yoke, the magnet ring having a plurality of circumferentially spaced poles. One of the rotor yoke and the permanent magnet ring is an annular member including depressed portions along a peripheral edge located around a midpoint between each pole. The depressed portions are shaped so the motor produces a sinusoidal flux density. The other of the rotor yoke and the permanent magnet ring is an annular ring. In another aspect, the rotor has a rotor yoke and a permanent magnet ring mounted on the rotor yoke. The permanent magnet ring includes a plurality of circumferentially spaced poles. One of the rotor yoke and the permanent magnet ring includes a plurality of depressions along an outer peripheral edge shaped so the motor produces a sinusoidal flux density during operation. Each of the plurality of depressions is located around a junction defined by two poles. In either aspect, the rotor yoke can be skewed, and the magnet ring can be tapered.

28 Claims, 3 Drawing Sheets

MAGNET SHAPING AND POLE CONCENTRATION FOR REDUCTION OF COGGING TORQUE IN PERMANENT MAGNET MOTORS

BACKGROUND OF THE INVENTION

1. Field of the Invention

The invention relates in general to the reduction of cogging torque in permanent magnet motors, and particularly to brushless permanent magnet motors.

2. Description of the Related Art

Permanent magnet motors include a stator core, which is typically made of a stack of thin, metal laminations. The laminations are usually round, with a central opening. The stator core thus is generally cylindrical in shape, with a cavity extending lengthwise about its central axis. In brushless permanent magnet motors, each stator lamination includes radially-extending slot openings, or notches, from the central opening that are aligned when stacked to receive stator windings, or conductors.

The stator core surrounds a rotor, typically consisting of a circular steel shaft with a number of permanent magnets fixed around the circumference of the shaft. The rotor can also comprise a stack of laminations instead of a solid steel shaft. The permanent magnets are magnetized to form a plurality of magnetic poles.

In permanent magnet motors, cogging torque is caused by the combination of two factors, the permanent magnet magneto-motive force and the variation of the air gap permeance between the stator and the rotor. Cogging torque is represented by the following formula:

$$T_{cog}(\theta_r) = -dW/d\theta_r = -(\tfrac{1}{2})(MMF)^2(d\lambda/d\theta_r),$$

wherein $T_{cog}$ is the cogging torque;

W is the total energy of the field;

$\theta_r$ is the rotor position angle;

MMF is the magnetic excitation of the permanent magnets; and $\lambda$ is the air gap permeance.

In the design of permanent magnet machines, cogging torque is a concern because it adds unwanted harmonic components to the torque-angle curve, resulting in torque pulsation upon operation of the machine. Although net cogging torque is zero, it causes noise, power losses and inaccuracies, particularly in servo-positioning drives. Thus, reduction of the momentary cogging torque is desirable.

The reduction of cogging torque can be approached in a variety of ways. One is to reduce the rate of change of the air gap permeance. Another is to shift poles so that cogging torque produced by one pole cancels another. Finally, since the magnetic excitation of the permanent magnets is squared in the formula, a reduction in magnetic flux produced reduces cogging torque. One means disclosed by the prior art to reduce cogging torque is by shaping permanent poles using a tapered arc. Another is skewing the lamination stack of the stator. In either case, the use of discrete magnets can result in excessive cogging torque because of manufacturing tolerances in orienting the magnets on the rotor surface.

To overcome the problems with discrete magnets, it is sometimes possible to use a ring magnet mounted on the core, but the magnets of the ring must be perfectly aligned in some motors, or the cogging torque is increased. For example, in a permanent magnet brushless motor with nine slots and eight poles, the cogging torque is reduced by the cancellation effects from one magnet to another. When there is misalignment, the cogging torque increases. Thus, it is desired to create a machine design that reduces cogging torque through pole alignment without the drawbacks of present methods.

SUMMARY

The present invention is a rotor for a permanent magnet motor comprising a rotor yoke and a permanent magnet ring mounted on the rotor yoke, the permanent magnet ring including a plurality of circumferentially spaced poles. One of the rotor yoke and the permanent magnet ring is an annular member including depressed portions along an outside peripheral edge, each depressed portion located around a midpoint between two poles. The depressed portions are shaped so the motor produces a sinusoidal flux density. In one aspect of the invention, the other of the rotor yoke and the permanent magnet ring is an annular ring.

In one aspect of the invention, the rotor yoke is skewed. In this aspect, the magnet ring preferably includes the depressed portions, but another aspect includes the depressed portions on the rotor yoke.

In another aspect of the invention, each of the plurality of poles is tapered along each depressed portion. In this aspect, the magnet ring preferably includes the depressed portions.

The rotor yoke can comprise a stack of laminations in yet another aspect of the invention.

Preferably, the permanent magnet ring is a pressed permanent magnet ring.

The depressed portions can form a variety of shapes. For example, the depressed portions can form roughly trapezoidal or ovoid depressions. Each of the depressed portions can also form an apex of a triangle. In a preferred aspect, each of the depressed portions is uniform in shape.

In yet another aspect of the invention, the magnet ring includes six poles.

The magnet ring comprises one of a rare-earth magnetic material and a ceramic magnetic material.

Another rotor of the present invention comprises a rotor yoke and a permanent magnet ring mounted on the rotor yoke, the permanent magnet ring including a plurality of circumferentially spaced poles. One of the rotor yoke and the permanent magnet ring includes a plurality of depressions along an outer peripheral edge. Each of the plurality of depressions located around a junction defined by two poles, and the plurality of depressions are shaped so the motor produces a sinusoidal flux density during operation.

In this aspect, the outer peripheral edge can be annular between the plurality of depressions. In another aspect of the invention, the other of the rotor yoke and the permanent magnet ring has an annular outer peripheral edge.

In yet another aspect of the rotor, the rotor yoke is skewed. Each of the plurality of poles can be tapered along each of the plurality of depressions.

In another aspect, each of the plurality of depressions is uniform in shape.

The present invention improves the orientation of magnet poles with respect to each other. It allows the use of tapered magnetic poles with a ring magnet and/or skew of the rotor core.

BRIEF DESCRIPTION OF THE DRAWING

The various features, advantages and other uses of the present invention will become more apparent by referring to the following detailed description and drawing in which.

DETAILED DESCRIPTION

Figure 1:
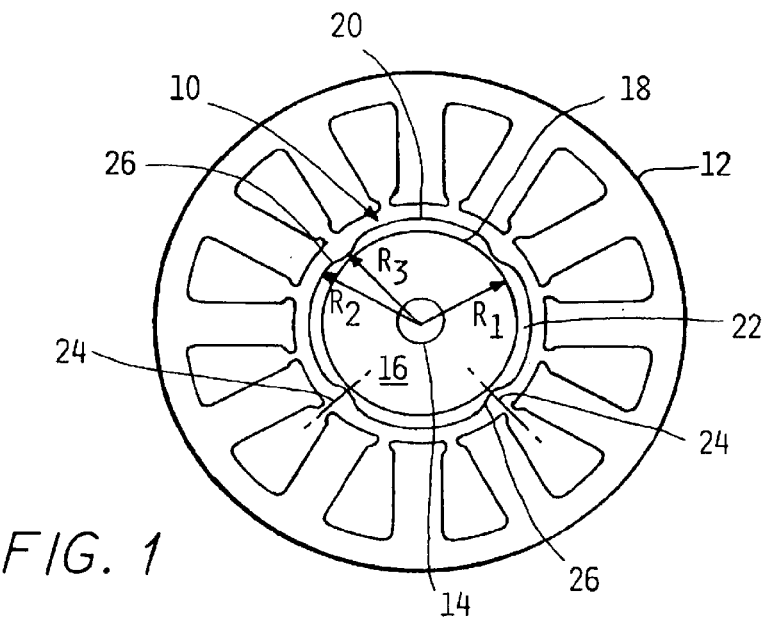
FIG. 1 is a plan view of a four-pole rotor design according to one aspect of the present invention, the rotor surrounded by a toothed stator lamination.
Figure 6:
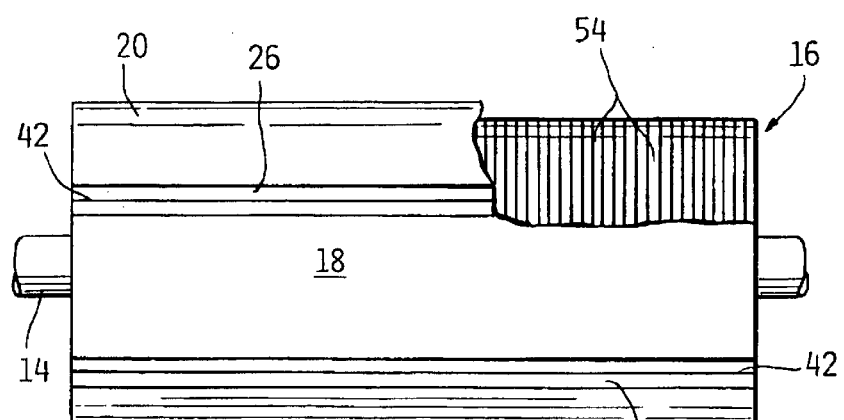
FIG. 6 is a partial cut-away side view of the rotor yoke according to one aspect of the present invention.

The present invention is intended to reduce cogging torque in permanent magnet motors by improving the alignment of magnet poles as is shown in the drawing, particularly in FIGS. 1–4 and 6. FIG. 1 shows a four-pole rotor design according to one aspect of the invention. Specifically, FIG. 1 shows a rotor 10 surrounded by a stator core 12 without windings. The stator core 12 is preferably a stack of ferrous stator laminations. Here, the stator core 12 is a twelve-tooth design by example only. The rotor 10 is mounted on a rotatable shaft 14. The yoke 16 of the rotor 10 according to this aspect of the invention is an annular steel yoke 16 extending a predetermined radius $R_1$ from the center of the shaft 14. Alternatively, the yoke 16 comprises a stack of ferrous laminations 54 as shown in FIG. 6. Coupled to the yoke 16 is a first embodiment of a ring magnet 18 with a peripheral edge 20 at a maximum radius $R_2$ from the center of the shaft 14.

Along the annular peripheral edge 20 of the ring magnet 18 are a plurality of pole shapes 22 on which poles are centered, four here by example only. At each junction 24 between two pole shapes 22, the peripheral edge 20 of the ring magnet 18 forms a depressed edge portion, or depression, 26 located around the junction 24 between two pole shapes 22, which is preferably at a midpoint between the poles located on the two pole shapes 22. The depressed portion 26 of the peripheral edge 20 in the embodiment of FIG. 1 extends from radius $R_2$ of the peripheral edge 20 to a minimum radius $R_3$ and back to the peripheral edge 20 at radius $R_2$ to form a shallow concave groove by example only. Each depressed portion 26 can form any shape located around the junction 24. Preferably, each depressed portion 26 is the same shape, and each is symmetrical about the junction 24, but this uniformity is not necessary.

Figure 2A:
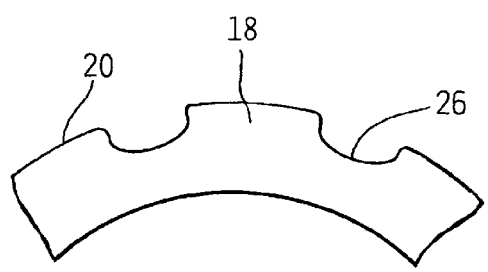
FIGS. 2A–2C are three examples of possible shapes for the depressed portions of the magnet ring of the rotor design of FIG. 1.
Figure 2B:
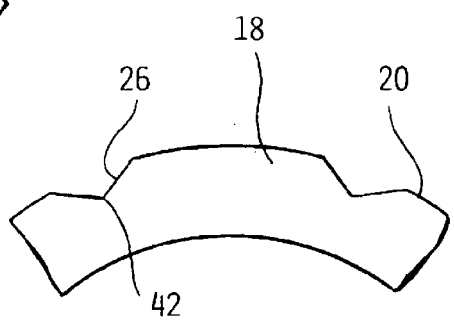
Figure 2C:
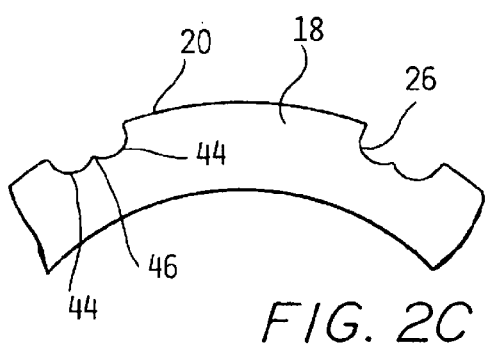

FIGS. 2A through 2C show three examples of other shapes each depressed portion, or depression, 26 can take. The depressed portion 26 of FIG. 2A forms an arc roughly ovoid in shape. That is, the depressed portion 26 starts at the outside peripheral edge 20 and approaches the edge of the yoke 16 in a continuously curved segment and returns to the outside peripheral edge 20. In the aspect shown in FIG. 2B, the depressed portion 26 forms the apex of a shallow triangle in the peripheral edge 20 by two edge segments each starting at the outside peripheral edge 20 and joining at a point 42 closer to the yoke 16. FIG. 2C shows the depressed portion 26 as a scallop-shaped depression in the peripheral edge 20. The scalloped-shaped depression 26 is formed of two of more concave arcs 44 (only two shown) starting at the peripheral edge 20 and extending into the ring magnet 18.

Each set of concave arcs 44 join at a smaller convex arc 46. The depressed portion 26 of the peripheral edge 20 can also form a roughly trapezoidal shape, to be discussed in further detail in the aspect shown in FIG. 3.

Figure 5:
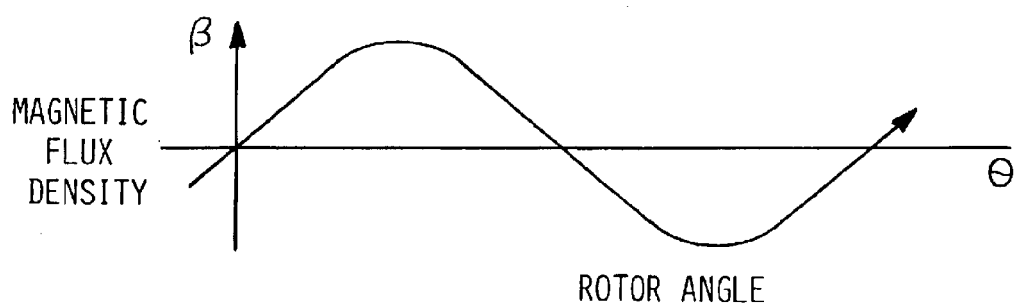
FIG. 5 is a graph of rotor angle versus magnetic flux density of a motor incorporating the rotor designs according to FIGS. 1 and 3.

The depth and width of the shape is derived from an iterative process starting when a rotor 10, including the number of poles and the shape and size of the depressed portions 26, is chosen. Then, numerical modeling of the rotor 10 and stator, such as a stator incorporating the stator core 12, is performed to calculate cogging torque, output torque, magnetic field strength and other machine variables for the particular electric machine design. The depth or the width of the depressed portions 26 is adjusted, and the numerical modeling is performed again until the machine design is optimized. The shape may also be changed. The machine design is optimized when the magnetic field generated by the magnets is roughly sinusoidal as shown in FIG. 5, and other machine variables are optimized. For example, an optimized design maximizes output torque and minimizes cogging torque. Of course, the machine must be designed to operate in the linear range of its flux density curve. Other variables of the machine design known to those skilled in the art are also modeled and can be included in the optimization.

The ring magnet 18 of FIG. 1 can be created in a number of ways. The ring magnet 18 is preferably formed of a rare-earth magnetic material such as Neodymium-iron-boron or Samarium cobalt. Alternatively, a ceramic (ferrite) magnetic material can be used. The ring magnet 18 is preferably created by pressing magnet powder into a shaped mold, which is then sintered to form a solid, pressed ring magnet 18. Thus, skew can be added to produce a skewed pole. Alternatively, the ring magnet 18 can be formed as an annular ring, and the shape of the peripheral edge 20 is formed using machining techniques to taper the poles shapes 22 to junctions 24 between them, forming the depressed portions 26. Extrusion can also be used to form the ring magnet 18. In any case, the ring magnet 18 can be one piece extending along the length of the yoke 16, or can comprise more than one ring mounted axially adjacent each other along the length of the yoke 16. The ring magnet 18 is coupled to the yoke 16 according to conventional means and can be subjected to either radial or parallel magnetization to form its poles on the pole shapes 22.

In this design, pole-to-pole orientation is improved over conventional discrete magnet placement due to machining accuracy.

Figure 3:
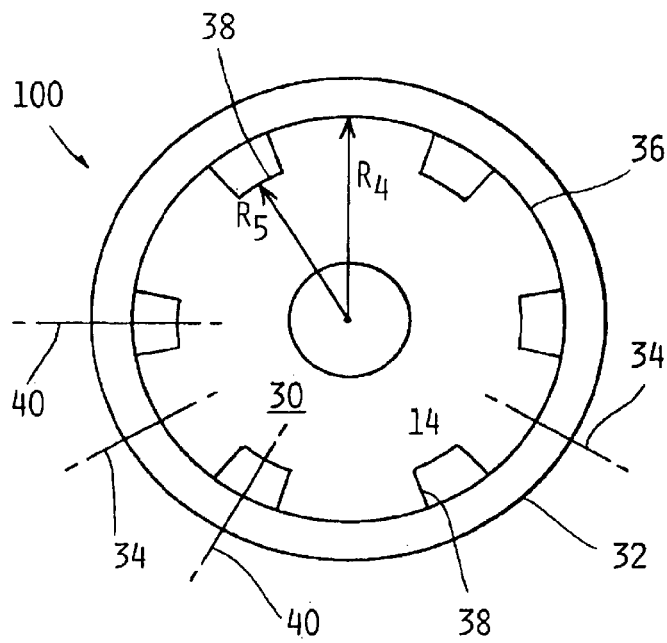
FIG. 3 is a plan view of a six-pole rotor design of another aspect of the present invention.

FIG. 3 shows a rotor design according to another aspect of the invention. The rotor 100 is mounted on a rotatable shaft 14 and includes a yoke 30 surrounded by an annular ring magnet 32. [As previously discussed] Like the first embodiment of the ring magnet 18 described with respect to FIG. 1, the ring magnet 32 is formed of a magnetic material, either a rare-earth magnetic material or a ceramic magnetic material and can be formed by extrusion or by pressing. The ring magnet 32 of FIG. 3 has six poles, each generally centered at line 34. The poles of the ring magnet 32 can be formed by subjecting the ring magnet 32 to either radial or parallel magnetization.

The yoke 30 of the rotor 100 comprises a stack of ferrous laminations extending to a maximum predetermined radius R4 from the center of the shaft 14 to a peripheral edge 36. The yoke 30 can include skew. In another aspect, the yoke 30 is a solid steel yoke. The yoke 30 is roughly annular in shape but has a plurality of depressed portions, or depressions, 38 along the peripheral edge 36. Each depressed portion 38 is located and preferably centered about a junction 40 at the midpoint between two poles, each of which is centered at a line 34. The depressed portion 38 of the peripheral edge 36 in the embodiment of FIG. 3 extends from radius $R_4$ to a minimum radius $R_5$ along a radial path, follows a circumferential path along the same radius $R_5$, then extends along another radial path to the peripheral edge 36 at radius $R_4$ to form a shallow, roughly trapezoidal shape.

Figure 4A:
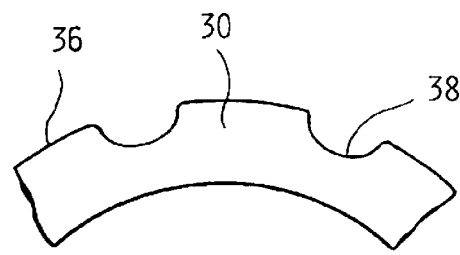
FIGS. 4A–4C are three examples of possible shapes for the depressed portions of the rotor yoke of the rotor design of FIG. 3.
Figure 4B:
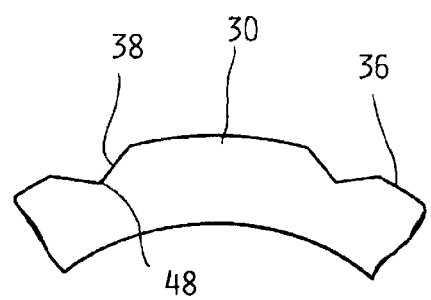
Figure 4C:
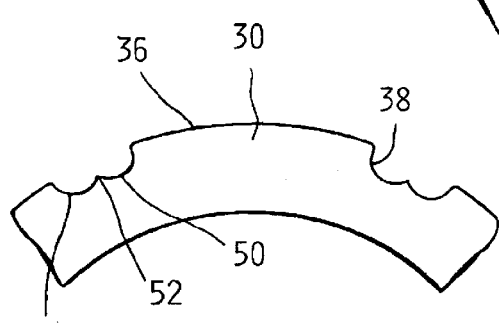

The shape of the depressed portion 38 of the peripheral edge 36 of the rotor yoke 30 is shown as a roughly trapezoidal shape by example only. Each depressed portion 38 can form any shape located around the junction 40. Preferably, each depressed portion 38 is the same shape, and each is symmetrical about the junction 40, but this uniformity is not necessary. FIGS. 4A through 4C show three examples of other shapes the depressed portion 38 can take. The depressed portion 38 of FIG. 4A forms an arc roughly ovoid in shape, i.e., the depressed portion 38 starts at the outside peripheral edge 36 and approaches the edge of the rotatable shaft 14 in a continuously curved segment and returns to the outside peripheral edge 36. In the aspect shown in FIG. 4B, the depressed portion 38 forms the apex of a shallow triangle in the peripheral edge 36 by two edge segments each starting at the outside peripheral edge 36 and joining at a point 48 closer to the rotatable shaft 14. Finally, FIG. 4C shows the depressed portion 38 as a scallop-shape depression in the peripheral edge 36. The scalloped-shaped depression 38 is formed of two or more concave arcs 50 (only two shown) starting at the peripheral edge 36 and extending into the ring magnet 18. Each set of concave arcs 50 join at a smaller convex arc 52. The depressed portion 38 can also take the shallow, concave groove shape of the depressed portion 26 of the ring magnet 18 shown in FIG. 1.

The depth and width of the shape, as was previously described, is derived from an iterative process starting when a rotor 100, including the number of poles and the shape and size of the depressed portions 38 are chosen. Then, numerical modeling is performed to optimize the particular machine design by changing the size, i.e., the depth or width, of the shape. In some circumstances, the shape itself must be changed during the iterative process. The depth or the width of the depressed portions 38 is adjusted, and the numerical modeling is performed again until the machine design is optimized. Consistent with the previous discussion, it is desired in the design that the magnetic field generated by the magnets is roughly sinusoidal as shown in FIG. 5, and other machine variables are optimized.

As mentioned, the yoke 30 of the rotor 100 preferably comprises a stack of ferrous laminations. The laminations are formed of thin, metal sheets pressed, or stamped, then joined by conventional means to form the yoke 30, which can be skewed. The yoke 30 can also be created by pressing powdered metal into a shaped mold, which is then sintered to form a solid metal yoke. Alternatively, whether the yoke 30 is a solid metal yoke or a stack of laminations, the shape of the yoke 30 can be formed first by creating an annular peripheral edge 36, then forming the depressed portions 38 through machining techniques. The yoke is mounted on the shaft 14 according to conventional means.

In the design of FIG. 3, the steel allows for accurate pole alignment by directing the magnetization and concentrating the field at the pole locations.

Thus, the present invention improves the locating ability of the magnet poles on a rotor through the use of a ring magnet with a rotor yoke. Each aspect allows more accurate magnetization of the ring magnet by shaping either the rotor yoke or the ring magnet. Although four- and six-pole ring magnets are shown, any number of poles is possible. For example, eighteen- and twenty-pole designs are also possible.

What is claimed is:

1. A rotor for a permanent magnet motor, comprising:
   a rotor yoke; and
   a permanent magnet ring mounted on the rotor yoke, the permanent magnet ring including a plurality of circumferentially spaced poles, and wherein a radially-inner peripheral edge of the permanent magnet ring has a constant diameter;
   one of the rotor yoke and the permanent magnet ring being an annular member including depressed portions along a radially-outer peripheral edge; and
   the depressed portions shaped so the motor produces a sinusoidal flux density during operation.

2. The rotor of claim 1 wherein the other of the rotor yoke and the permanent magnet ring is ring-shaped.

3. The rotor of claim 1 wherein the rotor yoke is skewed.

4. The rotor of claim 3 wherein the rotor yoke includes the depressed portions.

5. The rotor of claim 3 wherein the magnet ring includes the depressed portions.

6. The rotor of claim 1 wherein each of the plurality of poles is tapered along each depressed portion.

7. The rotor of claim 6 wherein the magnet ring includes the depressed portions.

8. The rotor of claim 1 wherein the rotor yoke comprises a stack of laminations.

9. The rotor of claim 1 wherein the permanent magnet ring is a pressed permanent magnet ring.

10. The rotor of claim 1 wherein each of the depressed portions roughly forms one of a trapezoidal depression and an ovoid.

11. The rotor of claim 1 wherein the magnet ring includes six poles.

12. The rotor of claim 1 wherein each of the depressed portions forms an apex of a triangle.

13. The rotor of claim 1 wherein the magnet ring comprises one of a rare-earth magnetic material and a ceramic magnetic material.

14. The rotor of claim 1 wherein each of the depressed portions is uniform in shape.

15. The rotor of claim 1 wherein each depressed portion is located at a junction of two poles.

16. The rotor of claim 1 wherein the rotor yoke is mountable on a shaft of the permanent magnet motor.

17. The rotor of claim 16 wherein the rotor yoke is non-magnetized.

18. A rotor for a permanent magnet motor, comprising:
   a rotor yoke; and
   a permanent magnet ring adhered to the rotor yoke, the permanent magnet ring including a plurality of circumferentially spaced poles and the permanent magnet ring having a radial edge opposed to the rotor yoke, the radial edge having a first constant radius;
   one of the rotor yoke and the permanent magnet ring including a plurality of depressions along a peripheral edge adjacent the other of the permanent magnet ring and the rotor yoke; and
   the plurality of depressions shaped so the motor produces a sinusoidal flux density during operation.

19. The rotor of claim 18 wherein the rotor yoke is skewed.

20. The rotor of claim 18 wherein each of the plurality of poles is tapered along each of the plurality of depressions.

21. The rotor of claim 18 wherein each of the plurality of depressions is uniform in shape.

22. The rotor of claim 18 wherein the rotor yoke is mountable on a shaft of the permanent magnet motor.

23. The rotor of claim 18 wherein each of the plurality of depressions is located at a junction of two poles.

24. The rotor of claim 18 wherein each of the plurality of depressions roughly forms one of a trapezoidal depression and an ovoid depression and an apex of a triangle.

25. A rotor for a permanent magnet motor, comprising:

a rotor yoke; and a permanent magnet ring adhered to the rotor yoke, the permanent magnet ring including a plurality of circumferentially spaced poles and the permanent magnet ring having a radial edge opposed to the rotor yoke, the radial edge having a first constant radius;

one of the rotor yoke and the permanent magnet ring including a plurality of depressions along a peripheral edge adjacent the other of the permanent magnet ring and the rotor yoke; and the plurality of depressions shaped so the motor produces a sinusoidal flux density during operation; and wherein the peripheral edge has a second constant radius between the plurality of depressions.

26. A rotor for a permanent magnet motor, comprising:

a rotor yoke; and a permanent magnet ring adhered to the rotor yoke, the permanent magnet ring including a plurality of circumferentially spaced poles and the permanent magnet ring having a radial edge opposed to the rotor yoke, the radial edge having a first constant radius;

one of the rotor yoke and the permanent magnet ring including a plurality of depressions along a peripheral edge adjacent the other of the permanent magnet ring and the rotor yoke; and the plurality of depressions shaped so the motor produces a sinusoidal flux density during operation; and wherein the other of the rotor yoke and the permanent magnet ring has a radial edge having a third constant radius and adjacent the peripheral edge.

27. A rotor for a permanent magnet motor, comprising:

a rotor yoke wherein the rotor yoke is non-magnetized; and a permanent magnet ring mounted on the rotor yoke, the permanent magnet ring including a plurality of circumferentially spaced poles, and wherein a radially-inner peripheral edge of the permanent magnet ring has a constant diameter;

one of the rotor yoke and the permanent magnet ring being an annular member including depressed portions along a radially-outer peripheral edge; and the depressed portions shaped so the motor produces a sinusoidal flux density during operation.

28. A rotor for a permanent magnet motor, comprising:

a rotor yoke wherein the rotor yoke is non-magnetized; and a permanent magnet ring adhered to the rotor yoke, the permanent magnet ring including a plurality of circumferentially spaced poles and the permanent magnet ring having a radial edge opposed to the rotor yoke, the radial edge having a first constant radius;

one of the rotor yoke and the permanent magnet ring being an annular member including depressed portions along a radially-outer peripheral edge; and the plurality of depressions shaped so the motor produces a sinusoidal flux density during operation.

* * * * *